United States Patent [19]
Schulze et al.

[11] 4,263,542
[45] Apr. 21, 1981

[54] METHOD AND CIRCUIT ARRANGEMENT FOR CONTROLLING AN ASYNCHRONOUS MOTOR SUPPLIED FROM A STATIC FREQUENCY CHANGER

[75] Inventors: Helmut Schulze, Ober-Ramstadt; Klaus Moll, Frankenthal, both of Fed. Rep. of Germany

[73] Assignee: Brown, Boveri & Cie Aktiengesellschaft, Mannheim, Fed. Rep. of Germany

[21] Appl. No.: 963,990

[22] Filed: Nov. 27, 1978

[30] Foreign Application Priority Data

Nov. 25, 1977 [DE] Fed. Rep. of Germany ....... 2752600

[51] Int. Cl.$^3$ .............................................. H02P 5/40
[52] U.S. Cl. .................................... 318/803; 318/807; 318/812
[58] Field of Search ............................... 318/798–803, 318/805, 807–812

[56] References Cited
U.S. PATENT DOCUMENTS

| | | | |
|---|---|---|---|
| 4,041,361 | 8/1977 | Cornell | 318/808 X |
| 4,044,284 | 8/1977 | Plunkett et al. | 318/808 X |
| 4,044,285 | 8/1977 | Plunkett et al. | 318/808 X |
| 4,047,083 | 9/1977 | Plunkett | 318/807 |
| 4,088,934 | 5/1978 | D'Atre et al. | 318/808 X |
| 4,088,935 | 5/1978 | D'Atre et al. | 318/808 X |

*Primary Examiner*—Gene Z. Rubinson
*Attorney, Agent, or Firm*—Herbert L. Lerner

[57] ABSTRACT

Method for controlling the speed and torque of an asynchronous machine fed through a static frequency changer with impressed intermediate current link, a control variable for the frequency of the current delivered by the frequency changer being formed from an electrical variable corresponding to a slip frequency value and an electrical variable corresponding to actual value of a frequency proportional to the rotor speed of the asynchronous machine which includes operating the asynchronous machine with constant flux in a region of constant maximal torque, and adjusting the flux in the machine, in a region of constant maximal power, as a function both of voltage at commutating capacitors of a self-commutating inverter and of a respective load condition of the asynchronous machine.

4 Claims, 3 Drawing Figures

METHOD AND CIRCUIT ARRANGEMENT FOR CONTROLLING AN ASYNCHRONOUS MOTOR SUPPLIED FROM A STATIC FREQUENCY CHANGER

The invention relates to a method for controlling the speed and torque of an asynchronous machine fed through a static frequency changer or converter with impressed intermediate current link, a control variable for the frequency $f_1$ of the current delivered by the frequency changer being formed from an electrical variable corresponding to the value of slip frequency $f_2$ and an electrical variable corresponding to the actual value of a frequency $f_n$ proportional to the rotor speed; as well as to a circuit for performing the foregoing method.

Such a method has become known heretofore, for example, from the German published Non-prosecuted Patent Application DE-OS No. 23 61 339. In this method, control of the asynchronous motor is effected by varying the frequency of the motor voltage. A self-commutating inverter, for example, can serve for supplying the asynchronous motor. A circuit for such an inverter is known from the German journal ETZ-A, 1975, page 520, FIG. 2.

In the circuit arrangement described therein, rectangular blocks of current are fed to the asynchronous machine from the inverter. These rectangular blocks of current, besides the desired fundamentals of the current, also contain a multitude of harmonics of higher frequencies, which lead to oscillating torques in the asynchronous machine. Capacitors are provided in this inverter for commutating the current. The magnitude of the voltage at these capacitors depends, on the one hand, on the motor voltage and the phase angle thereof relative to the motor current and, on the other hand, upon the motor current per se, the stray inductances of the machine and the size of the capacitors. The capacitor size, in turn, depends upon the stray inductances of the machine at the maximum supply frequency and, in particular, upon the ratio of the motor voltage to the motor current in no-load operation.

In this heretofore known method for controlling an asynchronous motor supplied via a static frequency changer, the nominal flux, upon which the design of the motor is based, is kept as constant as possible with respect to the load and the supply frequency. The torque is then adjusted by setting-in or presetting the slip frequency. The slip frequency $f_2$ is the difference between the supply frequency $f_1$ and the rotational frequency $f_n$ of the machine i.e. the frequency of the rotor voltages and currents. The motor current is preset as a function of the slip frequency of the machine in such a manner that the flux of the motor remains constant. In the weakened-field region i.e. in the mode of operation wherein the region in which the maximum voltage is attained and the motor voltage can no longer be increased when the supply frequency is increased, the maximum voltage is kept constant and the torque of the motor is adjusted only by changing the slip frequency.

In this heretofore known method, therefore, to control the motor from no-load to full-load operation with the flux kept constant, the slip frequency of the motor is changed between slip frequency zero and the required maximal slip frequency. The design point for the size of the commutating capacitors proves to be at maximal supply frequency in such a control method. In no-load operation, the slip frequency is zero and the motor current corresponds to the magnetization current. At this operating point, the maximum ratio of the motor voltage to the motor current is obtained which, in substance, together with the maximum frequency, determines the size of the commutating capacitors. In full-load operation with correspondingly high current, however, a capacitor voltage several times greater than in no-load operation is obtained across these capacitors. The semiconductor elements in the inverter must also be designed for these high capacitor voltages. Also affected are the insulation of the machine and the ripple of the intermediate-link current, and the size and weight of the intermediate-link choke coil.

It is accordingly an object of the invention to provide a control method, in which the voltage stress of the commutating capacitors and the semiconductor components is kept very low. The method should furthermore afford improved results with respect to the dynamics of the drive.

With the foregoing and other objects in view, there is provided, in accordance with the invention, a method for controlling the speed and torque of an asynchronous machine fed through a static frequency changer with impressed intermediate current link, a control variable for the frequency of the current delivered by the frequency changer being formed from an electrical variable corresponding to a slip frequency value and an electrical variable corresponding to a slip frequency value and an electrical variable corresponding to actual value of a frequency proportional to the rotor speed of the asynchronous machine which comprises operating the asynchronous machine with constant flux in a region of constant maximal torque, and adjusting the flux in the machine, in a region of constant maximal power, as a function both of voltage at commutating capacitors of a self-commutating inverter and of a respective load condition of the asynchronous machine.

In accordance with an alternate form of the invention, there is provided a method for controlling the speed and torque of an asynchronous machine fed through a static frequency changer with impressed intermediate current link, a control variable for the frequency of the current delivered by the frequency changer being formed from an electrical variable corresponding to a slip frequency value and an electrical variable corresponding to actual value of a frequency proportional to the rotor speed of the asynchronous machine which comprises operating the asynchronous machine with a slip frequency corresponding to load torque, in a region of constant maximal torque and, in a region of constant maximal power, shifting range of control of the slip frequency toward greater values as a function of the frequency proportional to the rotor speed.

In accordance with another feature of the invention, the method comprises reversing the torque of the asynchronous machine and, in the region of constant torque, operating the machine with nominal flux and, in the region of constant maximal power, operating the machine approximately with nominal flux.

In accordance with the invention, there is also provided a circuit for performing the method of controlling the speed and torque of an asynchronous machine comprising a current control element having a voltage input and a d-c output connected through a choke to an inverter, the inverter having commutating capacitors and having a-c outputs connected to the asynchronous machine, means for providing a current reference value, a measuring device connected to the inverter for determining the voltage at the commutating capacitors thereof, a commutating device having an input connected to the measuring device and having an output, a summing point having a pair of inputs and an output, the means for providing a current reference value and the output of the commutating device being connected to the inputs of the summing point for, respectively, feeding the current reference value and an output signal thereto, a difference forming device having an output and having a pair of inputs, one of which is connected to the output of the summing point, means for feeding an actual value of the current of the asynchronous machine to the other input of the difference forming device, a current regulator having an input connected to the output of the difference forming device and having an output, the current control element having a further input connected through a limiter to the output of the current regulator, a pair of summing devices having, respectively, a pair of inputs and an output, a control unit having an input and an output, means for feeding actual value of a frequency proportional to the rotor speed of the asynchronous motor to the input of the control unit and to one of the inputs of one of the summing devices, the output of the control unit being connected to one of the inputs of the other of the summing devices for feeding a variable signal from the control unit thereto, means for feeding a slip frequency to the other of the inputs of the other of the summing devices, the output of the other summing device being connected to the other input of the one summing device, and the output of the one summing device being connected to the inverter for feeding a control variable thereto formed from the frequency proportional to the rotor speed of the asynchronous motor and the output variable of the other summing device.

In accordance with another feature of the invention, there are provided generator means for determining the frequency proportional to rotor speed of the asynchronous machine, phase leads connecting the asynchronous motor to the generator means, an intermediate d-c link between the current control element and the inverter wherein the choke is connected, a measuring point disposed in the intermediate d-c link ahead of the choke and connected to the limiter for feeding thereto an actual current value determined by the measuring point, and a measuring point disposed in the phase leads for determining the actual value of the motor current.

In accordance with a further feature of the invention, the inverter comprises a three-phase bridge circuit and has three-phase leads connected to the asynchronous motor, the bridge circuit having respective halves wherein a respective plurality of thyristors are connected in respective connecting lines, a respective plurality of diodes connected by the respective connecting lines to the respective plurality of thyristors in each of the bridge circuit halves, series-connected commutating capacitors connected at junction points to the connecting lines in each of the bridge circuit halves, and measuring points operatively associated with the measuring device being disposed at the junction points, respectively. Each of the measuring points is associated with the measuring device through a respective line.

In the region of constant maximum torque, the asynchronous machine is operated with constant flux and in the weakened-field region i.e. at maximal power, the magnitude of the capacitor voltages is kept constant by influencing the magnitude of the stator current as well as the slip frequency output of the other summing device as a function of the maximum capacitor voltage. Since the capacitor voltage is composed of a component which results from the machine voltage and the phase angle relative to the machine current, and a component which is due to or determined by the magnitude of the motor current, the machine voltage can be increased over that at full-load operation in the partial-load range, at constant magnitude of the capacitor voltage. What is achieved thereby is that the asynchronous machine is operated in the entire operating range at a predetermined maximal capacitor voltage with the largest possible flux. This renders possible good dynamic behavior and optimal utilization of the machine in the entire operating range.

By predetermining a minimum value for the slip frequency output of the other summing device which is dependent upon the speed of the asynchronous machine, in the region of constant maximal power (weakened-field region), what is achieved is that the motor current, which determines the dimensioning of the commutating capacitors of the self-commutating converter, assumes a larger value in no-load operation than in heretofore known methods.

For this reason, the frequency range of the frequency changer operation can be expanded or broadened and, with the same specified frequency limits, the voltage stress of the elements can be reduced. In this thus defined region of field weakening, a given torque (partial-load operation) is set either by changing the stator current as well as by changing the slip frequency output of the other summing device.

For full operation in the region of constant power, the limitation of the capacitor voltage to a definite, predeterminable value is achieved by setting the reference value for the stator current of the asynchronous machine, by means of a commutating device, as a function of the voltage at the commutating capacitors of the self-commutating inverter.

During the transition from driving to braking operation, the slip frequency output of the other summing device is first set back to the minimum value therefor which corresponds to the speed of the machine. In accordance with the reduction of the slip frequency output of the other summing device, the motor current drawn by the asynchronous machine decreases to a minimum value of the slip frequency corresponding to the frequency proportional to the respective rotor speed of the machine. The major part of this current is used to build up the largest possible flux in the machine at the given maximal capacitor voltage.

Thus, a phase shift between the motor voltage and the motor current (fundamental) of nearly 90° occurs. Switching over the slip frequency from motor operation to generator operation or vice versa is possible in this operating condition without having to reduce the motor current to zero and without occurrence of torque shock.

Since the asynchronous machine is operated with an, in part, considerably larger flux during the transition from driving to braking operation, the duration time for reversing the torque can be reduced sharply.

Other features which are considered as characteristic for the invention are set forth in the appended claims.

Although the invention is illustrated and described herein as embodied in method and circuit arrangement for controlling an asynchronous motor supplied from a static frequency changer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
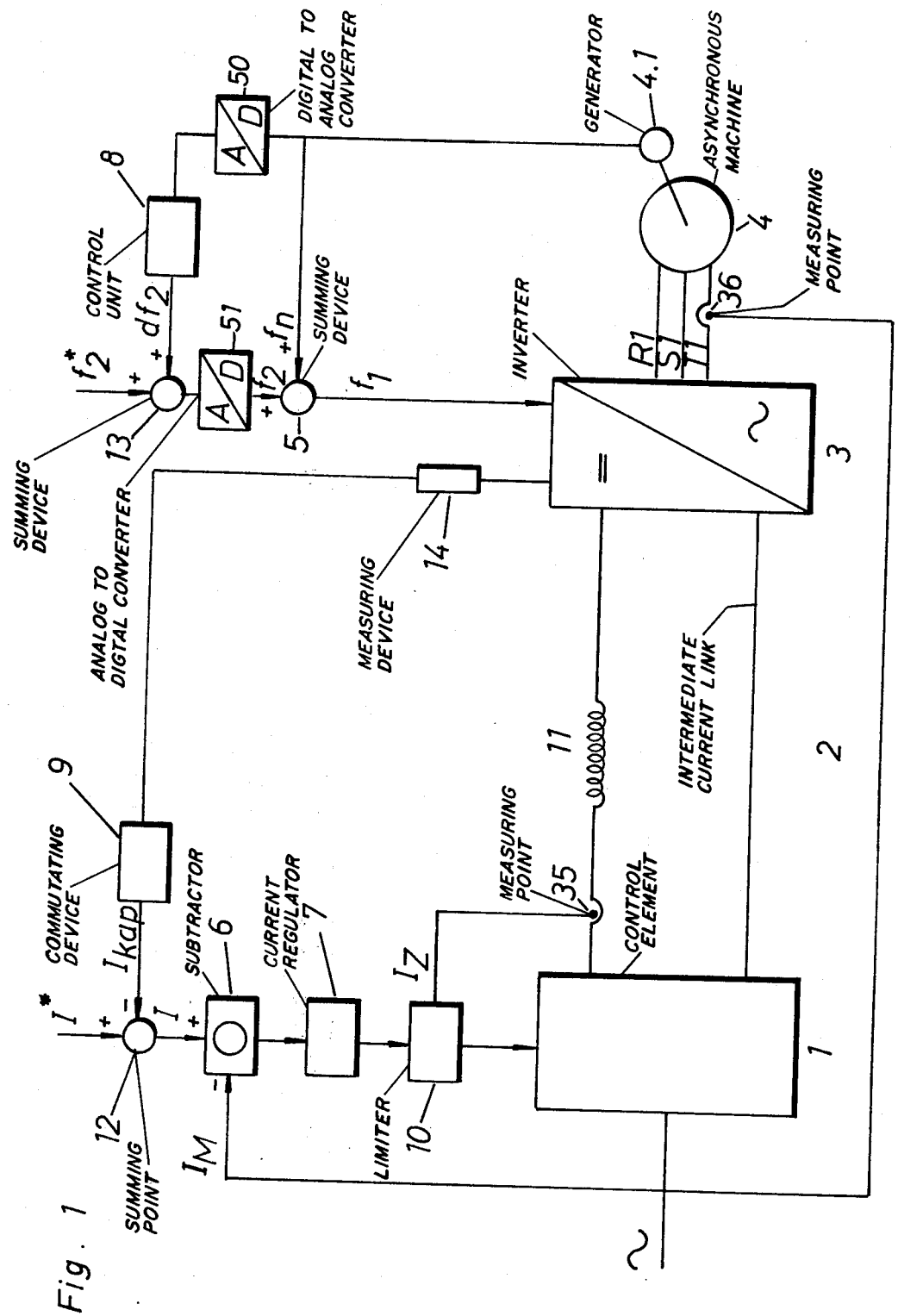
FIG. 1 shows the basic circuit diagram of a circuit for performing a method of controlling the speed and torque of an asynchronous machine in accordance with the method of the invention.

Referring now to the drawing and first, particularly, to FIG. 1 thereof, there are shown a control element 1 for the intermediate link current, such as a rectifier, for example, if the supply is from an a-c network or, such as a d-c chopper regulator, for example, if the supply is from a d-c source, an intermediate d-c link 2, an inverter 3 and an asynchronous machine 4. The latter is equipped with a generator 4.1 which serves to generate an electrical variable $f_n$ corresponding to the motor speed n. This generator 4.1 preferably followed directly by a digital-to-analog converter 50. The variable $f_n$ is fed to a summing device 5 as well as to a control unit 8. The control unit 8 is connected to a second summing device 13. To the latter are fed a frequency $f_2^*$ corresponding to the load condition and the output signal d $f_2$ of the control unit 8, which corresponds to a variable dependent upon the motor frequency which can be set-in or preset in a controllably determinable manner. The sum formed from the two variables $f_2^*$ and $f_2$ represents a frequency which is identical with the slip frequency, and is fed as a reference frequency to the summing device 5. An analog-to-digital converter 51 is disposed between the summing device 13 and the summing device 5.

The slip frequency $f_2$ is not, in this connection, a constant quantity; it rather depends on the load condition of the asynchronous machine and the motor speed n. The sum formed from the frequency $f_2$ and the frequency $f_n$ in the summing device 5 is fed as a control variable $f_1$ for the stator frequency of the asynchronous machine to the control device of the inverter 3, to which the summing device 5 is connected.

In addition, a difference forming device or subtractor 6 is provided. To the latter, there is fed the current reference value $I_{soll}$ and a variable which is proportional to the actual motor current $I_{Mist}$. The difference forming device 6 is connected to the input of a current regulator 7. The variable formed from the difference of the current reference value $I_{soll}$ and the actual value of the motor current $I_{Mist}$ is fed as input variable to the current regulator 7. The current regulator 7 is connected to the control element 1 through a limiter 10. The limiter 10 is provided for limiting the intermediate-link current to a maximum predeterminable value. For this purpose, the actual current value $I_{Zist}$ of the intermediate link is fed to the limiter 10 in addition to the output signal of the current regulator 7. For determining this variable i.e. the actual current value $I_{Zist}$, a measuring point 35, which is connected to the limiter 10, is disposed in the intermediate link circuit 2 between the control element 1 and the choke 11.

The current reference value $I_{soll}$ fed to the difference forming device 6 is formed in a summing point 12 preceding the difference forming device 6. To this end, a current reference value $I_{soll}^*$ and a current quantity $I_{Kap}$ are fed to the summing point 12. The current value $I_{soll}^*$ is made up of a component for the no-load current and a component corresponding to the demanded load torque. The quantity $I_{Kap}$ is the output signal of a commutating device 9. The input of the commutating device 9 is connected to a measuring device 14, which measures the voltages at the commutating capacitors of the inverter 3.

In the operating range up to the predetermined limits for the maximal capacitor voltages, the current reference value $I_{soll}$ fed to the difference forming device 6 corresponds to the value of the current reference value $I_{soll}^*$ fed to the summing point 12. In the operating range with constant maximal capacitor voltage, this current reference value $I_{soll}$ is so diminished by the output signal $I_{Kap}$ of the commutating device 9 that the capacitor voltages do not exceed the predetermined value thereof.

Figure 2:
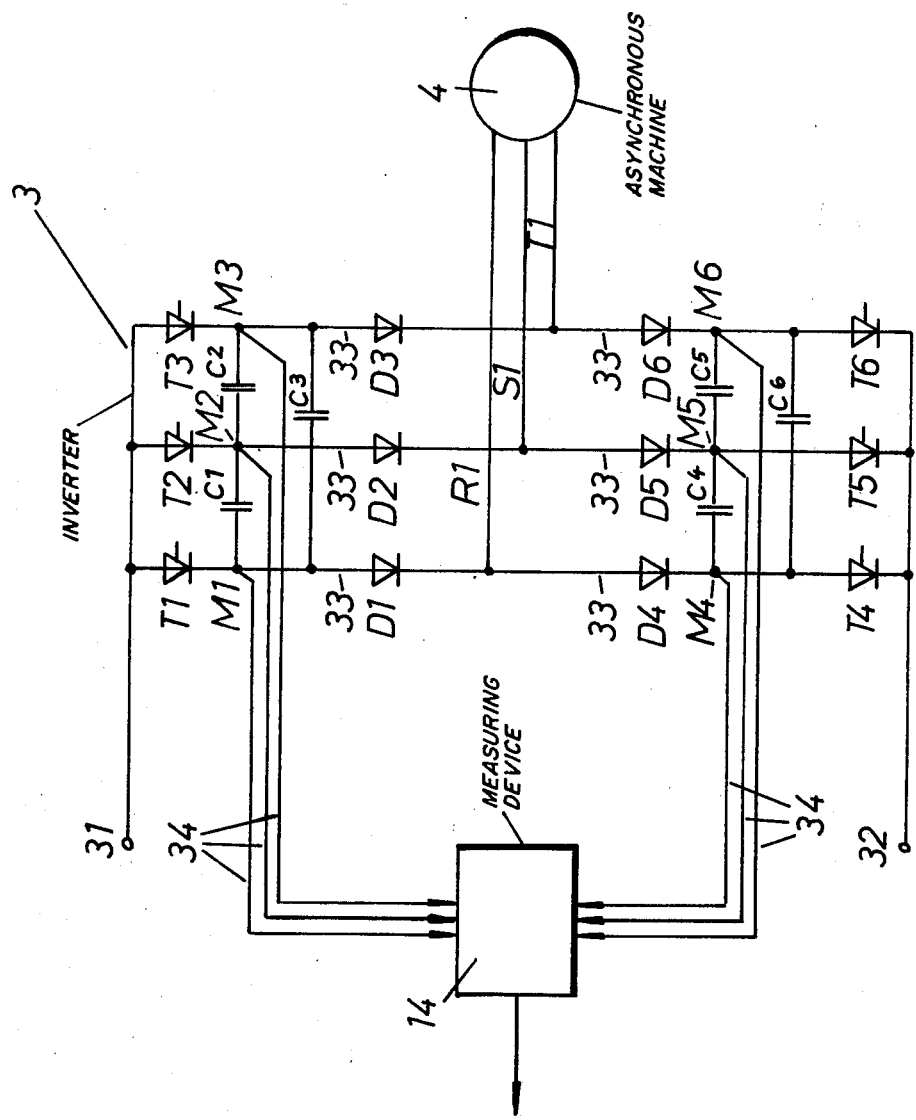
FIG. 2 is a circuit diagram of the inverter shown in FIG. 1.

In FIG. 2, the inverter 3 used for the circuit of FIG. 1 is shown with its commutating device provided for phase sequence quenching. The connections of the inverter 3 to the intermediate d-c link 2 are shown at 31 and 32. The inverter 3 has three-phase leads R1, S1, T1 connected to the asynchronous machine 4. The inverter 3 is constructed as a three-phase bridge circuit, a first half of the bridge having thyristors T1, T2 and T3, and the second half of the bridge being equipped with thyristors T4, T5 and T6. Diodes D1, D2 and D3, on the one hand, and D4, D5 and D6, on the other hand, are respectively connected between the thyristors of each bridge half and the phase leads R1, S1 and T1. Three commutating capacitors C1, C2 and C3, on the one hand, and C4, C5 and C6, on the other hand, are respectively disposed between the thyristors and the diodes of each bridge half. Three arms or branches 33, respectively, of each half are connected to one another by two series-connected capacitors C1 and C2, on the one hand, and C4 and C5, on the other hand, respectively. The first and the third arm or branch 33 of each bridge half are connected to each other by a capacitor C3 and C6, respectively, which are connected in parallel with the respective capacitor pairs C1, C2 and C4, C5. Measuring points M1, M2 and M3, on the one hand, and M4, M5 and M6, on the other hand, are provided in the connecting lines of the thyristors T1, T2 and T3, on the one hand, and T4, T5 and T6, on the other hand, respectively, and the diodes D1, D2 and D3, on the one hand, and D4, D5 and D6, on the other hand, respectively, at the junction points with the two series-connected commutating capacitors C1 and C2, on the one hand, and C4 and C5, on the other hand, respectively. Each measuring point is connected to the measuring device 14 through a respective line 34. With this circuit arrangement, the voltages at the commutating capacitors can be determined continuously.

Figure 3:
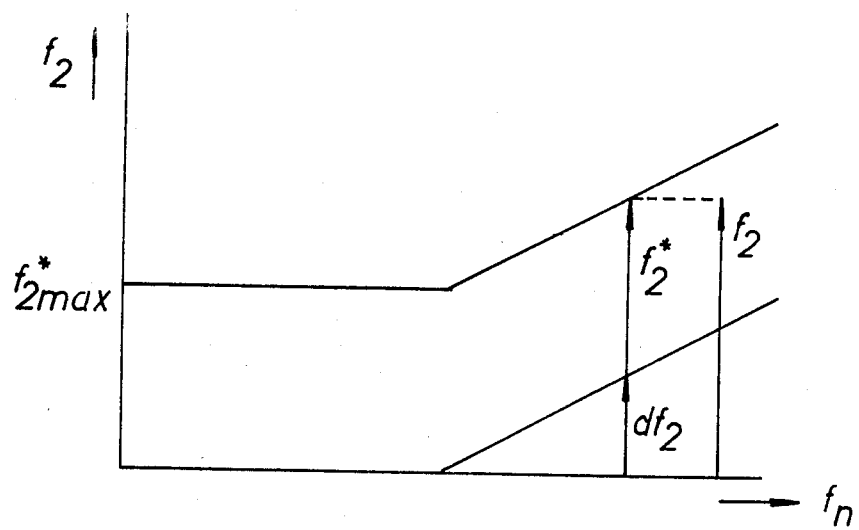
FIG. 3 is a plot diagram wherein the slip control range is shown as a function of the motor speed $f_n$.

In FIG. 3, a plot diagram is shown in which the slip range is represented as a function of the frequency $f_n$. Up to a frequency $f_{nTyp}$ (generally, the region with constant maximum torque), the asynchronous machine 4 is operated with a frequency value between $f_2$=zero and $f_2 = f_{2Max}^*$ which is adjusted by means of the control circuit as a function of the demanded load torque.

At speeds of the asynchronous machine 4 above the frequency $f_n = f_{nTyp}$, the slip control range is shifted toward greater values of the slip frequency $f_2$ by a value $d\ f_2$ which is controlled in dependence on the motor speed.

There are claimed:

1. Method for controlling the speed and torque of an asynchronous machine having a rotor, a static frequency changer or self-commutating inverter with commutating capacitors and an impressed intermediate current link, which comprises feeding the machine through the static frequency changer with the impressed intermediate current link, forming a control variable for the frequency of the current delivered by the frequency changer from an electrical variable corresponding to a slip frequency value and an electrical variable corresponding to actual value of a frequency proportional to the rotor speed of the asynchronous machine, operating the asynchronous machine with constant flux in a region of constant maximal torque, adjusting the flux in the machine to a maximal value in an operating region of constant maximal power in which maximal machine voltage is reached to hold the voltage constant in dependence on the voltage at the commutating capacitors of the self-commutating inverter, and simultaneously increasing the slip frequency in dependence on the rotor speed.

2. Circuit for performing a method of controlling the speed and torque of an asynchronous machine comprising a current control element having a voltage input and a d-c connected through a choke to an inverter, said inverter having commutating capacitors and having a-c outputs connected to the asynchronous machine, means for providing a current reference value, a measuring device connected to said inverter for determining the voltage at said commutating capacitors thereof, a commutating device having an input connected to said measuring device and having an output, a summing point having a pair of inputs and an output, said means for providing a current reference value and said output of said commutating device being connected to said inputs of said summing point for, respectively, feeding said current reference value and an output signal thereto, a difference forming device having an output and having a pair of inputs, one of which is connected to said output of said summing point, means for feeding an actual value of the current of the asynchronous machine to the other input of said difference forming device, a current regulator having an input connected to said output of said difference forming device and having an output, said current control element having a further input connected through a limiter to said output of said current regulator, a pair of summing devices having, respectively, a pair of inputs and an output, a control unit having an input and an output, means for feeding actual value of a frequency proportional to the rotor speed of the asynchronous motor to the input of said control unit and to one of the inputs of one of said summing devices, said output of said control unit being connected to one of said inputs of the other of said summing devices for feeding a variable signal from said control unit thereto, means for feeding a slip frequency to said other of said inputs of the other of said summing devices, said output of said other summing device being connected to the other input of said one summing device, and said output of said one summing device being connected to said inverter for feeding a control variable thereto formed from the frequency proportional to the rotor speed of the asynchronous motor and the output variable of said other summing device.

3. Circuit according to claim 2 including generator means for determining the frequency proportional to rotor speed of the asynchronous machine, phase leads connecting the asynchronous motor to said generator means, an intermediate d-c link between said current control element and said inverter wherein said choke is connected, a measuring point disposed in said intermediate d-c link ahead of said choke and connected to said limiter for feeding thereto an actual current value determined by said measuring point, and a measuring point disposed in said phase leads for determining the actual value of the motor current.

4. Circuit according to claim 2 wherein said inverter comprises a three-phase bridge circuit and has three-phase leads connected to the asynchronous motor, said bridge circuit having respective halves wherein a respective plurality of thyristors are connected in respective connecting lines, a respective plurality of diodes connected by the respective connecting lines to the respective plurality of thyristors in each of said bridge circuit halves, series-connected commutating capacitors connected at junction points to the connecting lines in each of said bridge circuit halves, and measuring points operatively associated with said measuring device being disposed at said junction points, respectively.

* * * * *